(12) United States Patent
Sugino et al.

(10) Patent No.: US 7,622,687 B2
(45) Date of Patent: Nov. 24, 2009

(54) TURN SIGNAL SWITCH DEVICE

(75) Inventors: Naoki Sugino, Miyagi-ken (JP); Hiroki Suto, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/034,910

(22) Filed: Feb. 21, 2008

(65) Prior Publication Data

US 2008/0202900 A1    Aug. 28, 2008

(30) Foreign Application Priority Data

Feb. 26, 2007    (JP) ............... 2007-045843

(51) Int. Cl.
*H01H 3/16*    (2006.01)
(52) U.S. Cl. .................... 200/61.3
(58) Field of Classification Search ............. 200/61.27, 200/61.3–61.36, 61.39
See application file for complete search history.

(56) References Cited

U.S. PATENT DOCUMENTS

| | | | | |
|---|---|---|---|---|
| 3,794,785 | A * | 2/1974 | Tomlinson | 200/61.27 |
| 5,030,802 | A * | 7/1991 | Noro | 200/61.27 |
| 5,949,040 | A * | 9/1999 | Hayakawa et al. | 200/61.34 |
| 6,194,676 | B1 * | 2/2001 | Takahashi et al. | 200/61.34 |
| 6,237,437 | B1 * | 5/2001 | Takahashi | 74/484 R |
| 6,677,543 | B2 * | 1/2004 | Takahashi et al. | 200/61.3 |
| 7,038,580 | B2 * | 5/2006 | Takahashi | 340/475 |
| 7,541,550 | B2 * | 6/2009 | Kosaka | 200/61.27 |

FOREIGN PATENT DOCUMENTS

DE    1 288 464    1/1969
DE    199 35 089 A1    2/2000

OTHER PUBLICATIONS

European Search Report issued in corresponding European Patent Application No. 08 00 3125; mailed Jun. 25, 2009.

* cited by examiner

*Primary Examiner*—Michael A Friedhofer
(74) *Attorney, Agent, or Firm*—Brinks Hofer Gilson & Lione

(57) ABSTRACT

A turn signal switch device capable of setting angles (release angles) in case a first lever member deviates from an outer peripheral face of a canceling projection and advances into a rotational locus at the time of right-turn operation and left-turn operation to the same angle is provided. A bent portion that is bent toward a rotational locus of a canceling projection is formed on the side of a free end of a first arm portion that protrudes linearly from a winding portion of a torsion coil spring, and when a distal end of a first lever member is dragged by the rotation of the canceling projection, and rotates in a direction away from the winding portion of the torsion coil spring, a resilient force is given to the first lever member from the bent portion of the first arm portion and a distal end on the side of the free end.

4 Claims, 8 Drawing Sheets

TURN SIGNAL SWITCH DEVICE

CLAIM FOR PRIORITY

This application claims benefit of Japanese Patent Application No. 2007-045843 filed on Jan. 26, 2007, which is hereby incorporated in its entirety by reference.

BACKGROUND

1. Field of the Invention

The present invention relates to a turn signal switch device that is additionally provided in a steering column or the like of an automobile and is used as a signal indicator, and particularly, to a canceling mechanism that automatically returns an operating lever included in the turn signal switch device to a neutral position.

2. Description of the Related Art

A turn signal switch device of an automobile rotatably supports a proximal end of an operating lever in a housing integrated with a steering column or the like, and rotationally operates a distal end of the operating lever from a neutral position to either right or left direction-indicating position, and thereby a lamp for left turn or right turn flickers. In such a turn signal switch device, in order to hold the operating lever in three positions including the right and left direction-indicating positions and the neutral position, a cam surface is provided in an inner surface on the side of the housing, and a driving body that engages the cam surface is provided on one side of the operating lever via a spring. Further, a canceling mechanism for automatically returning the operating lever to the neutral position when a steeling wheel is rotationally operated in a direction opposite to an indicating direction in a state where the operating lever has been rotationally operated to either right or left direction-indicating position is additionally provided (for example, refer to U.S. Pat. No. 5,949,040☐ corresponding to JP-A-269901).

FIG. 7 is a transverse sectional view showing the schematic configuration of a conventional turn signal switch device including this type of canceling mechanism, FIG. 8 is a plan view of the canceling mechanism, and FIG. 9 is an explanatory view of the operation of the canceling mechanism shown in FIG. 8.

In these drawings, reference numeral 100 represents a housing, and the housing 100 is fixed to a column cover, a combination switch, etc. (not shown) that are stator members of a steering system. A guide shaft 101 and a pivot 102 is erected from an inner bottom face of the housing 100 at a predetermined distance from each other, a first tong hole 103a of a first lever member 103 is fitted to the guide shaft 101, and a second lever member 104 is rotatably journalled to the pivot 102. The first lever member 103 has a second tong hole 103b, and the second tong hole 103b is fitted to a connecting pin 104a erected from the second lever member 104. Further, an abutting portion 103c and a cam portion 103d are erected from both front and rear ends of the first lever member 103, and the cam portion 103d has a cross-section that is formed in a semicircular shape. One arm portion 105a of the torsion coil spring (torsion coiled spring) 105 is hooked to the first lever member 103, and the first lever member 103 is resiliently biased in the longitudinal direction of both the tong holes 103a and 103b by the torsion coil spring 105. A winding portion 105b of the torsion coil spring 105 is inserted onto a boss 106 erected from the inner bottom face of the housing 100, and the other arm portion 105c is latched on a side watt of the housing 100. Further, the second lever member 104 has a first opening 104b and a second opening 104c, and both the openings 104b and 104c are in positions that face each other across the pivot 102.

An operating lever 107 is supported by the housing 100 so as to be rotatable about a pair of pivots 108, and a V-shaped cam surface 109 that has a pair of locking portions 109a on both sides thereof is formed inside the housing 100. A holder 110 is attached to the operating lever 107, and the operating lever 107 and the holder 110 integrally rotate in a horizontal direction with a straight fine connecting both the pivots 108 as an axis of rotation. A driving body 111 is slidably held at a distal end of the holder 110, and a tip of the driving body 111 is always brought into pressure contact with the cam surface 109 by a spring whose illustration is omitted. Further, a cam portion 112 and a receiving portion 113 are suspended from a member (not shown) that is integrally provided in the holder 110, the cam portion 112 faces the cam portion 103d of the first lever member 103, and the receiving portion 113 reaches the inside of the second opening 104c of the second lever member 104.

In the turn signal switch device configured in this way, in a cases where the operating lever 107 is in the neutral position, as shown in FIG. 7, the tip of the driving body 111 abuts on a central valley portion of the cam surface 109, and the driving body 111 is stably held in the position by the resilience of the spring that is not shown. At this time, as shown in FIG. 8, the cam portion 112 on the side of the operating lever 107 and the cam portion 103d of the first lever member 103 abut on each other at their apexes, and the first lever member 103 retreats against the biasing force of the torsion coil spring 105. Accordingly, the abutting portion 103c of the first lever member 103 is located out of a rotational locus of a canceling projection 114 that rotates in conjunction with the steeling wheel, and even if the steeling wheel is rotated in this state, the canceling projection 114 does not abut on the abutting portion 103c of the first lever member 103, and the operating lever 107 is maintained in the neutral position.

When the operating lever 107 is rotated in the direction of either an arrow A or an arrow B of FIG. 7 from the neutral position, the tip of the driving body 111 is locked to the locking portions 109a beyond the slope of the cam surface 109, and is stably held in the position by the locking portions 109a. For example, when the operating lever 107 is rotated in the direction of the arrow B of FIG. 7, the cam portion 112 and the receiving portion 113 are displaced to positions shown in (a-1) of FIG. 9 from FIG. 8 in conjunction with the rotation. Therefore, the cam portion 112 on the side of the operating lever 107 deviates from the apex of the cam portion 103d of the first lever member 103. As a result, the first lever member 103 receives the resilient force from the arm portion 105a of the torsion coil spring 105, and advances in the longitudinal direction of both the tong holes 103a and 103b, and the abutting portion 103c of the first lever member 103 abuts on an outer peripheral face of the canceling projection 114. Further, with the rotation of the operating lever 107 in the direction of the arrow B, switching operation of a contact point whose illustration is omitted is performed, and a lamp for right turn flickers.

When the steeling wheel is rotationally operated in a right-turn direction from the right-turn rotation state of the operating lever 107 shown in (a-1) of FIG. 9, the canceling projection 114 rotates in the direction of the arrow B white it comes into sliding contact with the abutting portion 103c of the first lever member 103, and when the canceling projection 114 has rotated by a predetermined angle θ1 as shown in (a-2) of FIG. 9, the abutting portion 103c of the first lever member 103 deviates from the outer peripheral face of the canceling projection 114, and advances into the rotational locus. Thereafter, when the steeling wheel is rotationally operated in the opposite direction (the direction of the arrow A) as shown in (a-3) of FIG. 9, the canceling projection 114 bumps against the abutting portion 103c of the first lever member 103 during the returning operation thereof. As a result, since the first lever member 103 rotates in the clockwise direction about the guide shaft 101, and the torque thereof is transmitted to the second lever member 104 via the connecting pin 104a from the second tong hole 103b, thereby rotating the second lever member 104 in the clockwise direction about the pivot 102, the second opening 104c of the second lever member 104 is rotationally displaced upward in this drawing. Since this causes a peripheral edge of the second opening 104c to press the receiving portion 113 upward, the driving body 111 deviates from the locking portions 109a of the cam surface 109, and shifts to the central valley portion, and the operating lever 107, and the first and second lever members 103 and 104 automatically return to the neutral position shown in FIG. 8.

On the other hand, when the operating lever 107 is rotated in the direction of the arrow A of FIG. 7 from the neutral position, the cam portion 112 and the receiving portion 113 are displaced to positions shown in (b-1) of FIG. 9 from FIG. 8 in conjunction with the rotation. Therefore, the cam portion 112 on the side of the operating lever 107 deviates from the apex of the cam portion 103d of the first lever member 103. As a result, the first lever member 103 receives the resilient force from the arm portion 105a of the torsion coil spring 105, and advances in the longitudinal direction of both the tong holes 103a and 103b, and the abutting portion 103c of the first lever member 103 abuts on an outer peripheral face of the canceling projection 114. Further, with the rotation of the operating lever 107 in the direction of the arrow A, switching operation of a contact point whose illustration is omitted is performed, and a lamp for left turn flickers.

Then, when the steeling wheel is rotationally operated in a left-turn direction from the left-turn rotation state of the operating lever 107 shown in (b-1) of FIG. 9, the canceling projection 114 rotates in the direction of the arrow A white it comes into sliding contact with the abutting portion 103c of the first lever member 103, and when the canceling projection 114 has rotated by a predetermined angle θ2 as shown in (b-2) of FIG. 9, the abutting portion 103c of the first lever member 103 deviates from the outer peripheral face of the canceling projection 114, and advances into the rotational locus. Thereafter, when the steeling wheel is rotationally operated in the opposite direction (the direction of the arrow B) as shown in (b-3) of FIG. 9, the canceling projection 114 bumps against the abutting portion 103c of the first lever member 103 during the returning operation thereof. As a result, the first lever member 103 rotates in the counterclockwise direction about the guide shaft 101, and the torque thereof is transmitted to the second lever member 104 via the connecting pin 104a from the second tong hole 103b, thereby rotating the second lever member 104 in the counterclockwise direction about the pivot 102. Therefore, the second opening 104c of the second lever member 104 is rotationally displaced downward in this drawing. Since this causes the peripheral edge of the second opening 104c to press the receiving portion 113 downward, the driving body 111 deviates from the locking portions 109a of the cam surface 109, and shifts to the central valley portion, and the operating lever 107, and the first and second lever members 103 and 104 automatically return to the neutral position shown in FIG. 8.

However, the aforementioned conventional turn signal switch device has a drawback in that, when the steeling wheel is rotationally operated in the same direction as the rotational direction of the operating lever 107 from a state where the operating lever 107 has been rotationally operated to a right turn or left-turn position, the angle (release angle) θ1 or θ2 when the first lever member 103 deviates from the outer peripheral face of the canceling projection 114 and advances into the rotational locus, may vary depending on to the rotational direction of the steeling wheel. This is because the contact place between the first lever member 103 and the arm portion 105a of the torsion coil spring 105 varies depending on the rotational direction of the first lever member 103, and accordingly, a difference is caused in the resilient force of the torsion coil spring 105 that presses the first lever member 103 in its advancing direction.

That is, when the steeling wheel is rotationally operated in the same direction as the rotational direction of the operating lever 107 from the right-turn rotation state of the operating lever 107, the canceling projection 114 is displaced to the position shown in (a-2) of FIG. 9 from (a-1) of FIG. 9, and the first lever member 103 deviates from the outer peripheral face of the canceling projection 114 and advances into the rotational locus. In this process, when the first lever member 103 rotates so that the abutting portion 103c may approach the winding portion 105b of the torsion coil spring 105, a contact place between a spring receiving portion of the first lever member 103 and the arm portion 105a of the torsion coil spring 105 moves toward the winding portion 105b, the torsion coil spring 105 deforms so that its deflection may be increased. Therefore, the torsion coil spring 105 biases the first lever member 103 in the advancing direction along the longitudinal direction of both the tong holes 103a and 103b with a comparatively large resilient force.

In contrast, when the steeling wheel is rotationally operated in the same direction as the rotational direction of the operating lever 107 from the left-turn rotation state of the operating lever 107, the canceling projection 114 is displaced to the position shown in (b-2) of FIG. 9 from (b-1) of FIG. 9, and the first lever member 103 deviates from the outer peripheral face of the canceling projection 114 and advances into the rotational locus. In this process, when the first lever member 103 rotates in a direction in which the abutting portion 103c is separated from the winding portion 105b of the torsion coil spring 105, a contact place between the spring receiving portion of the first lever member 103 and the arm portion 105a of the torsion coil spring 105 moves toward the distal end of the arm portion 105a, the torsion coil spring 105 deforms so that its deflection may be decreased. Therefore, the torsion coil spring 105 biases the first lever member 103 in the advancing direction along the longitudinal direction of both the tong holes 103a and 103b with a comparatively small resilient force.

As a result, when the canceling projection 114 rotates in the direction of the arrow B, the force that the torsion coil spring 105 pushes out the first lever member 103 in the advancing direction becomes large. Thus, when the first lever member 103 deviates from the outer peripheral face of the canceling projection 114 and advances into the rotational locus, the abutting portion 103c easily deviates from the outer peripheral face of the canceling projection 114. However, when the canceling projection 114 rotates in the direction of the arrow A, the force that the torsion coil spring 105 pushes out the first lever member 103 in the advancing direction becomes small. Thus, even at an angle to be released, the first lever member 103 hardly deviates from the outer peripheral face of the canceling projection 114 and consequently, the tip of the first lever member 103 is dragged and rotated by the canceling projection 114. Therefore, as shown in (a-2) of FIG. 9 and (b-2) of FIG. 9, the release angle θ2 (about 35 degrees) of the first lever member 103 when the canceling projection 114 rotates in the direction of the arrow A may become larger compared with the release angle θ1 (about 26 degrees) of the first lever member 103 when the canceling projection 114 rotates in the direction of the arrow B.

SUMMARY

The disclosure provides a turn signal switch device including a housing having a cam surface; an operating lever that is rotatably supported by the housing; a driving body that holds the operating lever in three positions including first and second operating positions and a neutral position in cooperation with the cam surface; a first lever member that advances into or retreats from a rotational locus of a canceling projection on the side of a steering wheel, and that is rotationally operated when abutting on the canceling projection in a state of having advanced into the rotational locus; a torsion coil spring that resiliently biases the first lever member so as to approach the rotational locus of the canceling projection; and a second lever member that returns the operating lever to the neutral position from the first and second operating positions in conjunction with the rotation of the first lever member. The first lever member is made to retreat out of the rotational locus of the canceling projection against the resilient force of the torsion coil spring by the operating lever when the operating lever is in the neutral position, and the first lever member is made to advance into the rotational locus of the canceling projection by the resilient force of the torsion coil spring when the operating lever is in the first and second operating positions. A winding portion of the torsion coil spring is supported in a lateral position of the first lever member by the housing, a bent portion that is bent toward the rotational locus of the canceling projection is formed on the side of a free end of one arm portion that protrudes linearly from the winding portion as a fixed end, the other arm portion is latched on the housing, and when a distal end of the first lever member rotates in a direction away from the winding portion, a resilient force is given to the first lever member from a portion between the bent portion and the distal end on the side of the free end.

In the turn signal switch device configured in this way, when the first lever member rotates in a direction away from the winding portion of the torsion coil spring in conjunction with the rotation of the canceling projection, the first lever member receives the resilient force from the bent portion of the torsion coil spring, and is biased in the advancing direction. However, since the bent portion is formed on the side of the free end of the arm portion that extends linearly from the winding portion of the torsion coil spring and is bent toward the rotational locus of the canceling projection. Therefore, the arm portion that protrudes linearly from the winding portion of the torsion coil spring will be deflected and deformed largely compared with a torsion coil spring where there is no bent portion. As a result, the force that the torsion coil spring pushes out the first lever member in the advancing direction becomes large, and when the first lever member advances into the rotational locus of the canceling projection (at the time of release), the first lever member easily deviates from the outer peripheral face of the canceling projection. Therefore, when the operating lever is rotationally operated to the first operating position or second operating position, the release angles of the operating lever can be set to be almost the same angle in each rotational direction.

BRIEF DESCRIPTION OF THE DRAWINGS

FIG. 5 is an explanatory view of the operation of the canceling mechanism;

FIG. 9 is an explanatory view of the operation of the canceling mechanism shown in FIG. 8.

DESCRIPTION OF THE EMBODIMENTS

Figure 1:
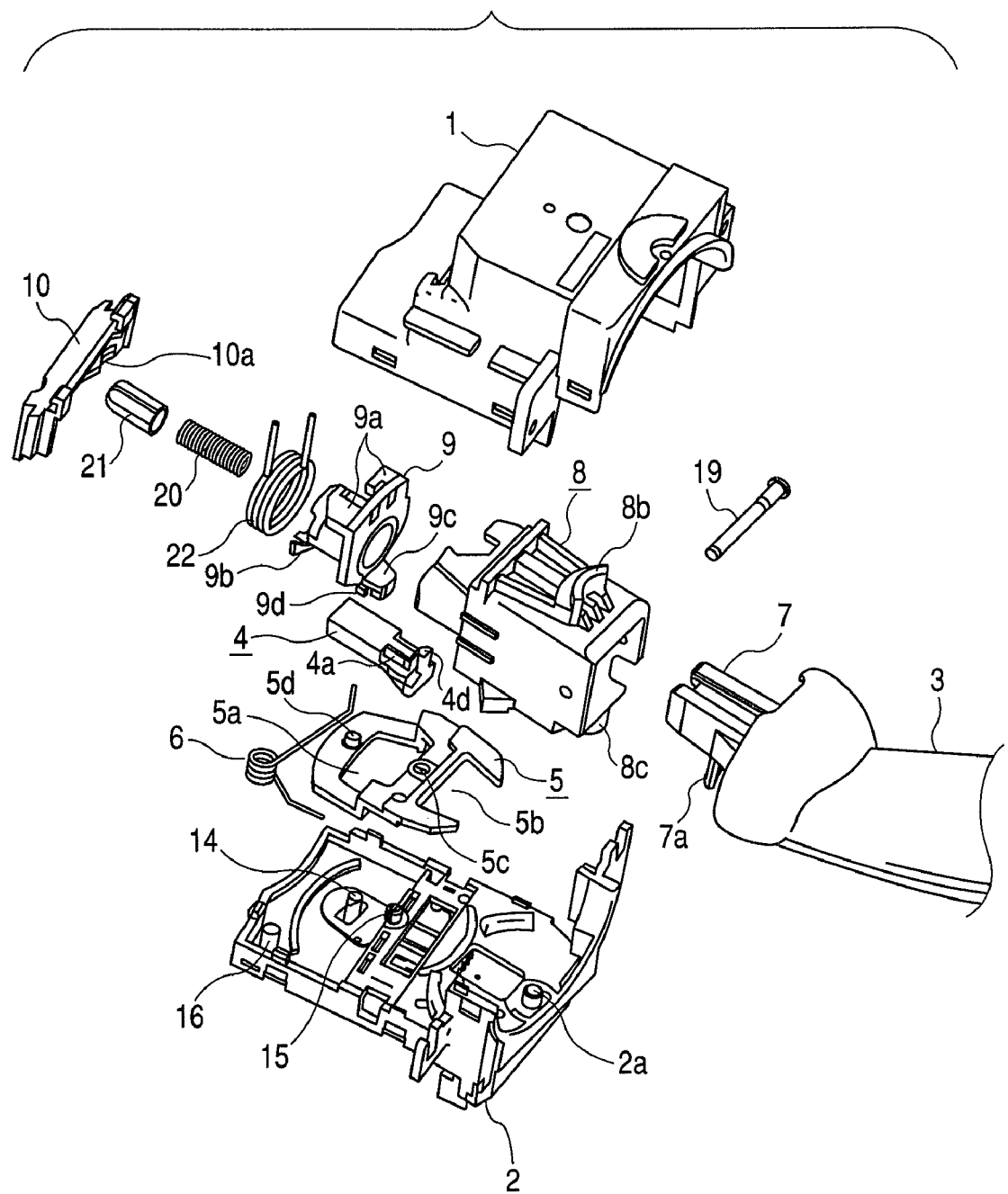
FIG. 1 is an exploded perspective view of a turn signal switch device according to an embodiment.
Figure 2:
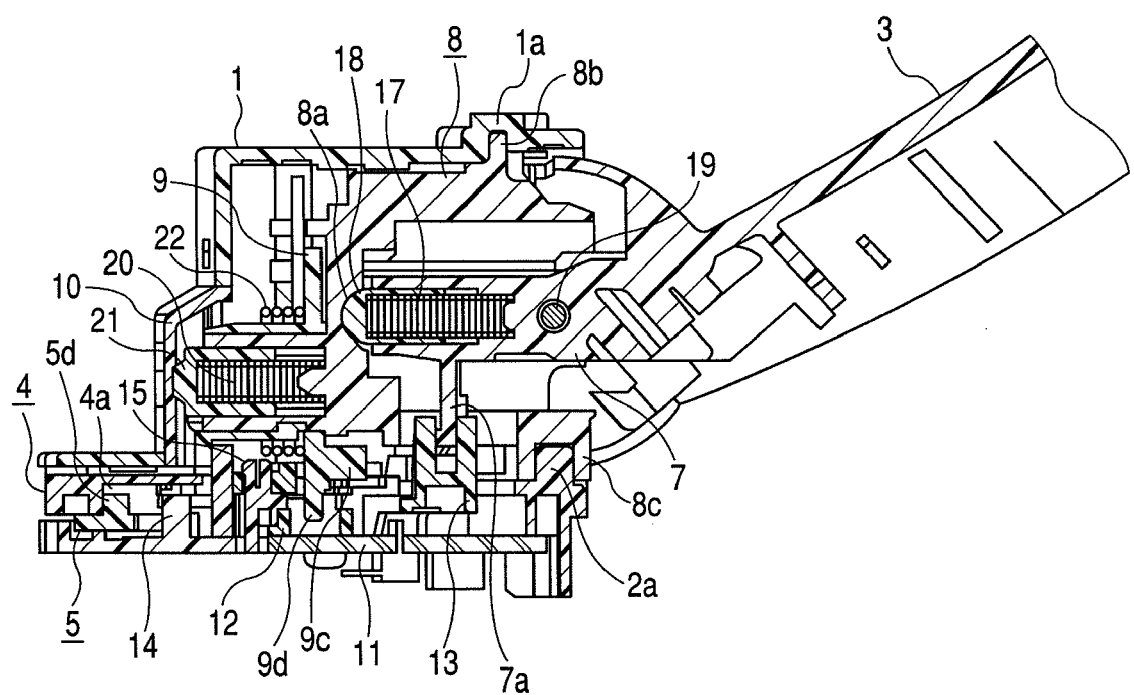
FIG. 2 is a longitudinal sectional view of the turn signal switch device.
Figure 3:
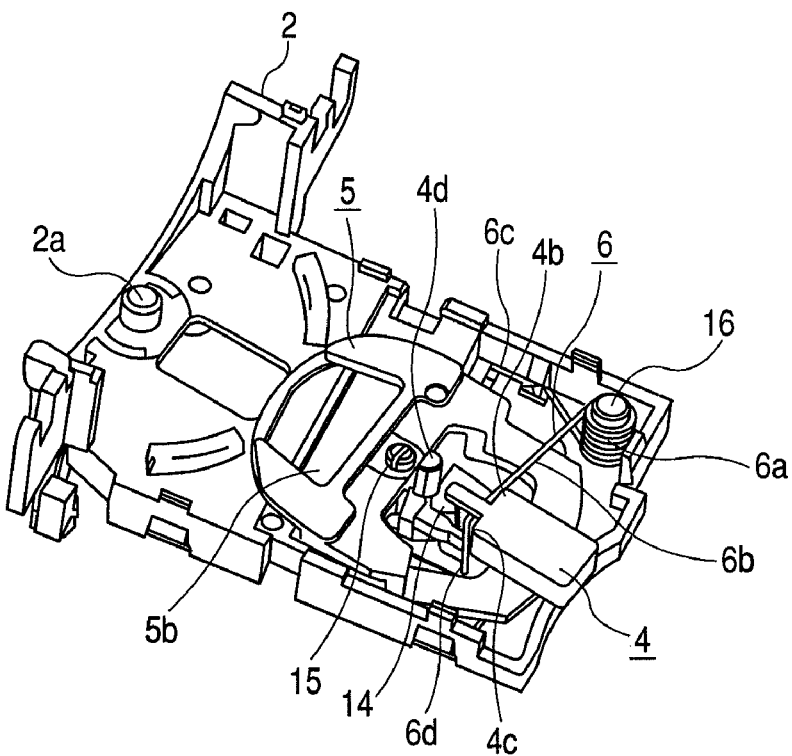
FIG. 3 is a perspective view showing principal parts of a canceling mechanism.
Figure 4:
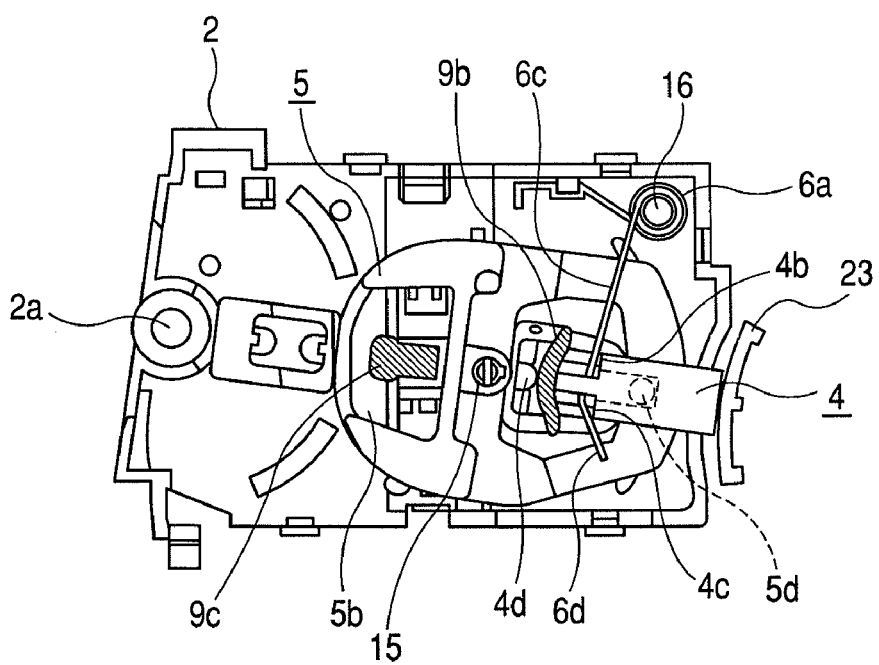
FIG. 4 is a plan view of the canceling mechanism.
Figures 1, 5A:
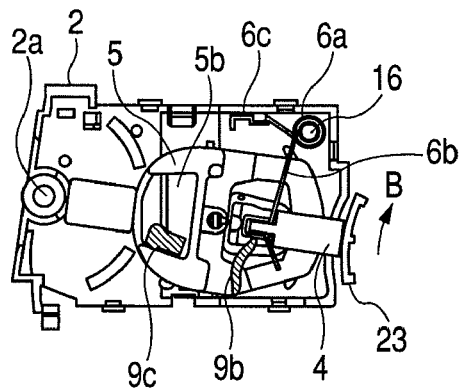
Figures 1, 5B:
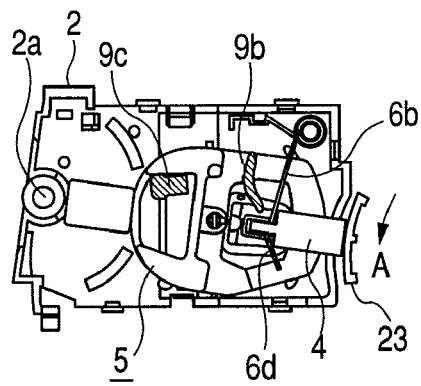
Figures 2, 5A:
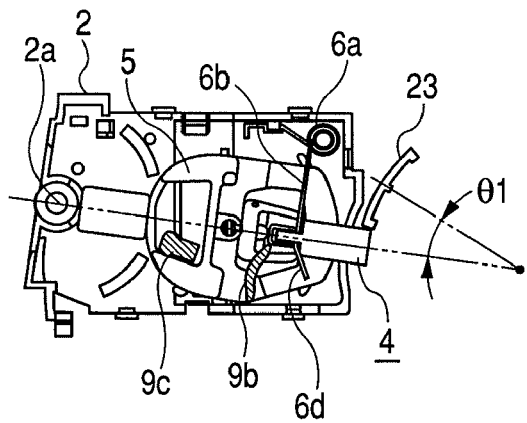
Figures 2, 5B:
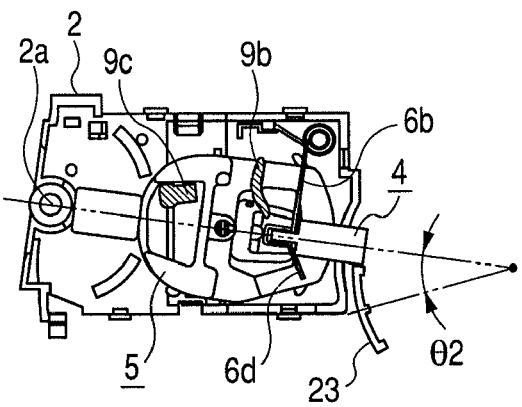
Figures 3, 5A:
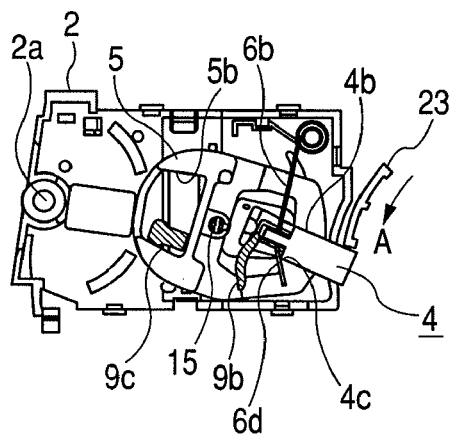
Figures 3, 5B:
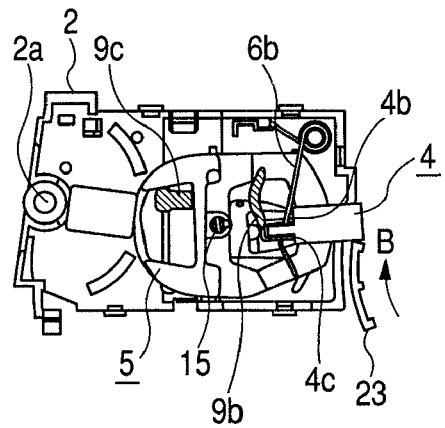
Figure 6:
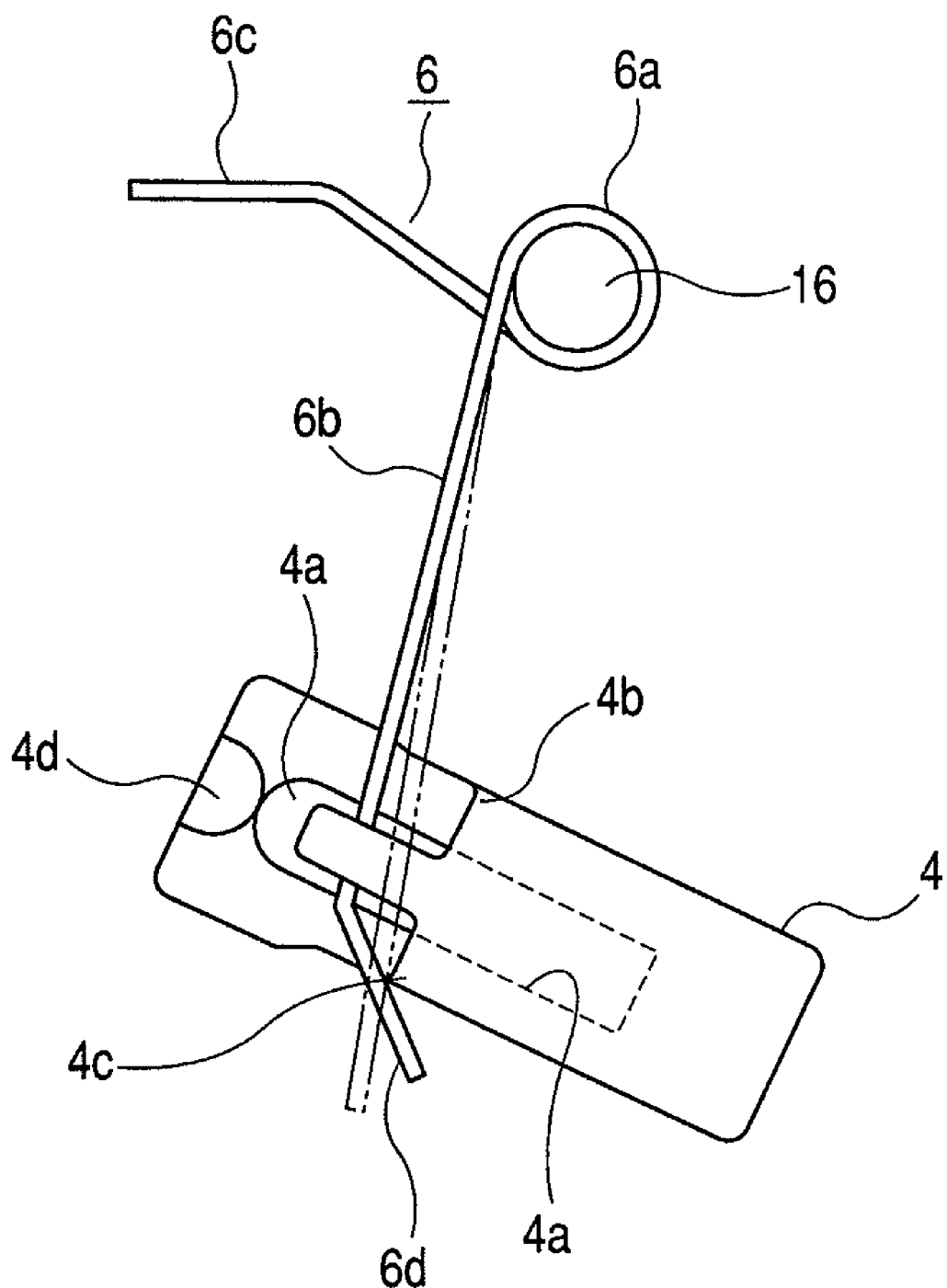
FIG. 6 is an explanatory view of the operation of a first lever member included in the canceling mechanism.
Figure 7:
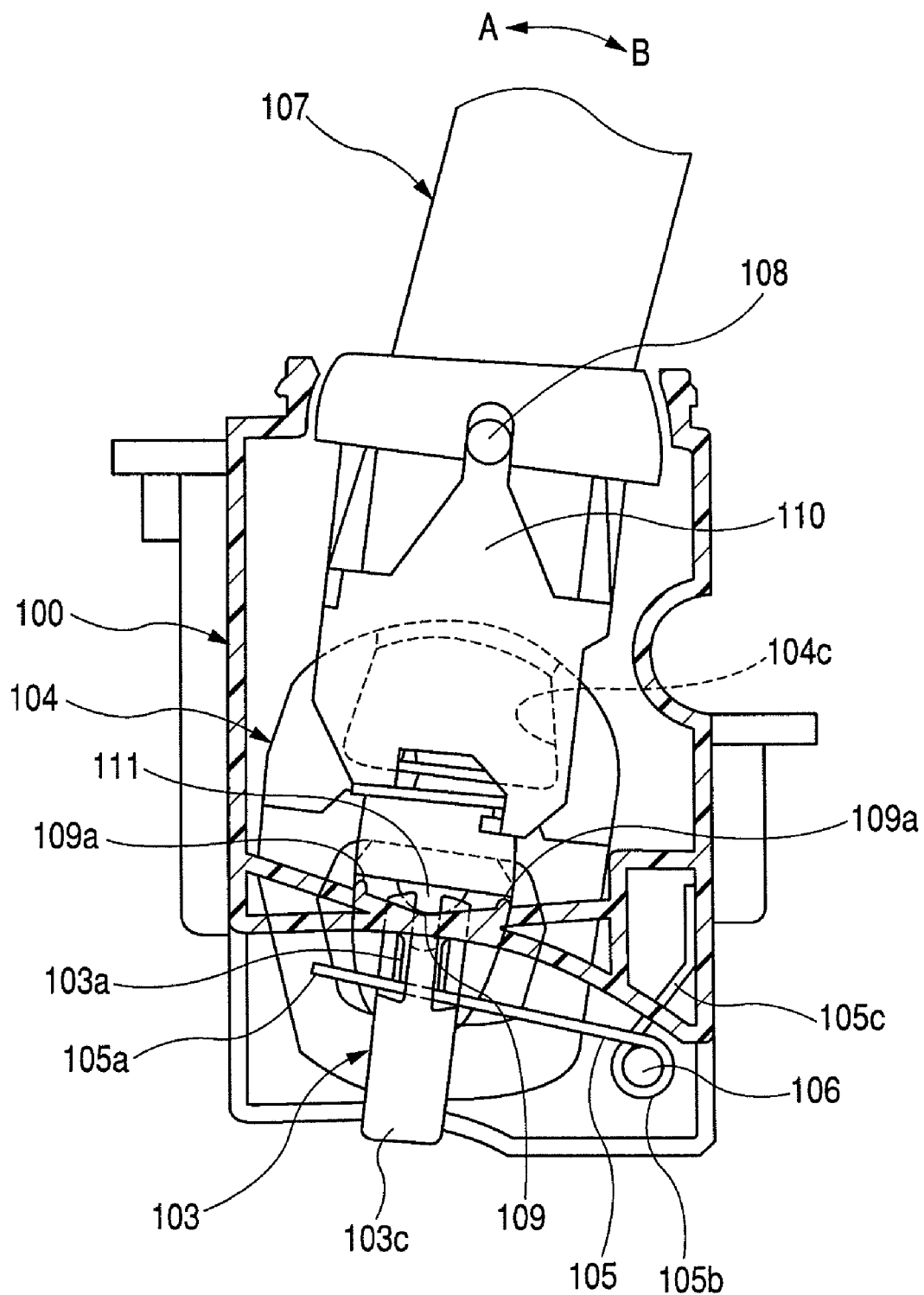
FIG. 7 is a transverse sectional view showing the schematic configuration of a conventional turn signal switch device according to a conventional example.
Figure 8:
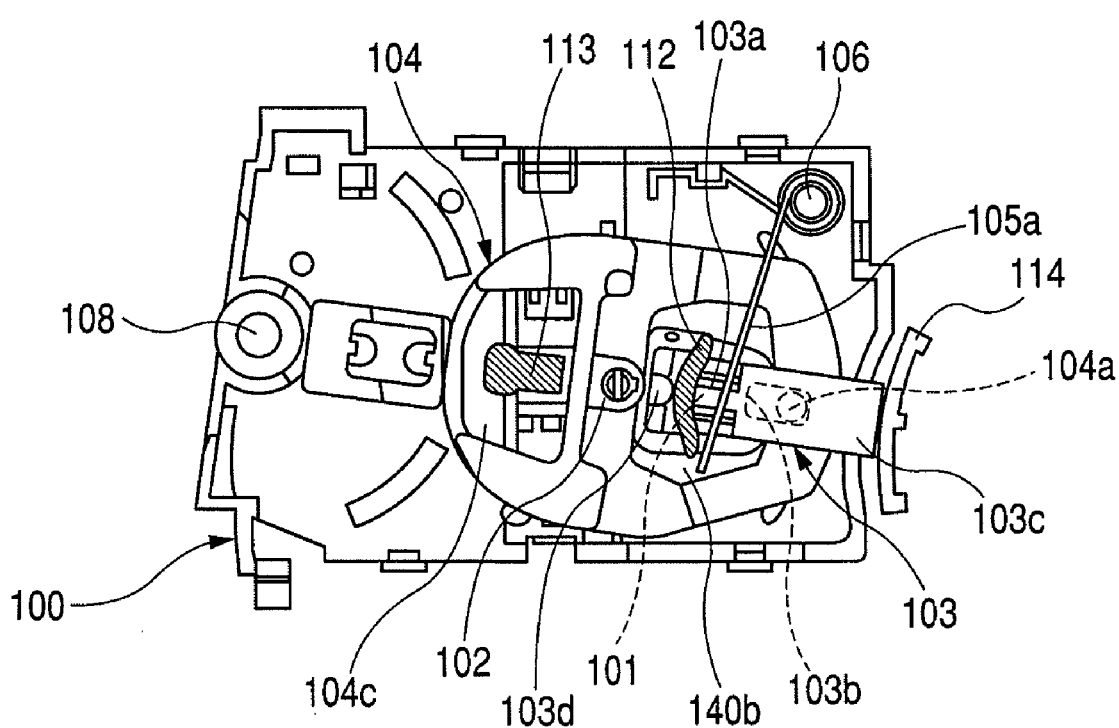
FIG. 8 is a plan view of the canceling mechanism according to the conventional example.
Figures 1, 9A:
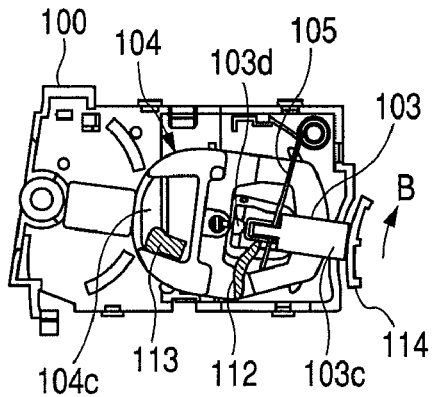
Figures 1, 9B:
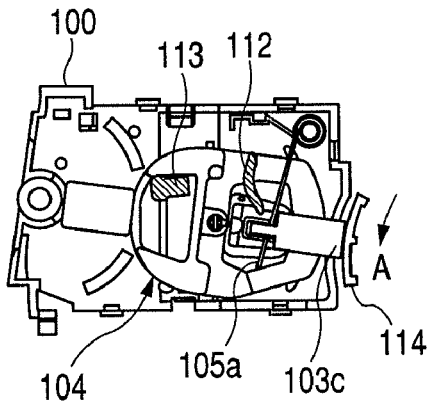
Figures 2, 9A:
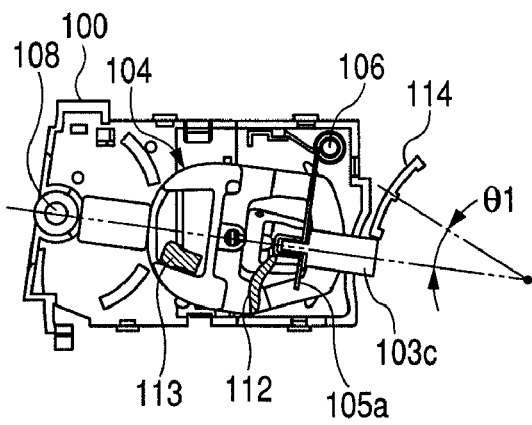
Figures 2, 9B:
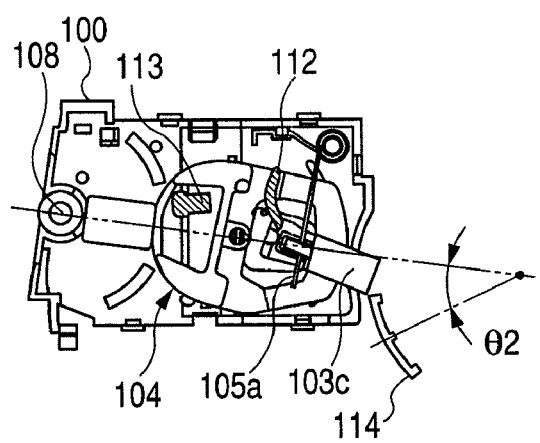
Figures 3, 9A:
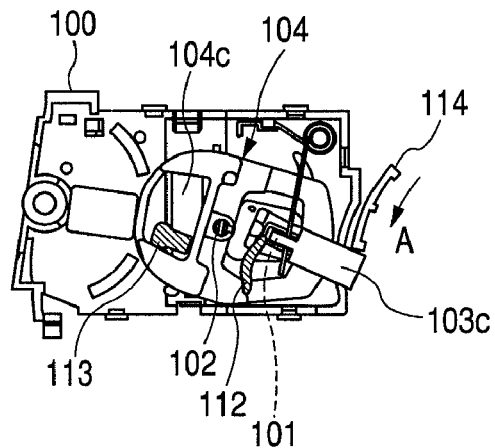
Figures 3, 9B:
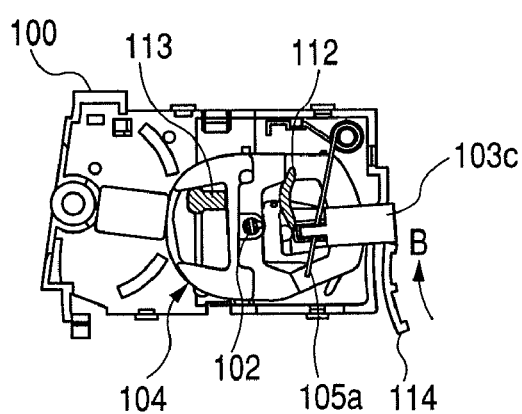

An embodiment of the invention will be described with reference to the accompanying drawings. FIG. 1 is an exploded perspective view of a turn signal switch device according to an embodiment of the invention, FIG. 2 is a longitudinal sectional view of the turn signal switch device, FIG. 3 is a perspective view showing principal parts of a canceling mechanism, FIG. 4 is a plan view of the canceling mechanism, FIG. 5 is an explanatory view of the operation of the canceling mechanism, and FIG. 6 is an explanatory view of the operation of a first lever member included in the canceling mechanism.

The turn signal switch device according to this embodiment is mainly composed of first and second cases 1 and 2 that are made of synthetic resin and constitute a housing, the operating lever 3 that is rotatably supported by both the cases 1 and 2, first and second lever members 4 and 5 that are placed on an inner bottom face of the second case 2, a torsion coil spring 6 that resiliently biases the first lever member 4 in a direction in which the first lever member protrudes from the second case 2. As will be described later, the operating lever 3 includes an actuating member 7, a holder 8, a movable member 9, and the like. The first and second cases 1 and 2 are integrated using means, such as snapping, and are fixed to stator members (not shown), such as a column cover and a combination switch.

A stop plate 10 is attached to the end of the first case 1 that is located opposite to a protruding direction of the operating lever 3, and an inner watt of the stop plate 10 is formed with a V-shaped cam surface 10a. Although illustration is omitted, the cam surface 10a has a central valley portion and a pair of locking portions located on both right and left sides of the valley portion. As shown in FIG. 2, a printed circuit board 11 is attached to an outer surface of a bottom plate of the second case 2, and a pair of slider receiving bodies 12 and 13 that slide on the printed circuit board 11 are exposed to an outer surface of a bottom plate of the second case 2. One slider receiving body 12 is driven by the rotating operation of the operating lever 3 in the left turn or right-turn direction, and performs flickering of a lamp for left turn or right turn that is not shown. The other slider receiving body 13 is driven by the rocking operation of the operating lever 3 in a vertical direction, and performs flickering of a lamp for beams that is not shown.

A guide shaft 14 and a pivot 15 are erected on the same fine at a predetermined distance from each other from an inner surface of the bottom plate of the second case 2, and a cylindrical boss 16 is erected from a corner of the inner surface of the bottom plate of the second case 2. The guide shaft 14 is located opposite to the protruding direction of the operating lever 3 across the pivot 15. The first lever member 4 is formed with a tong hole 4a, and the guide shaft 14 is inserted into the tong hole 4a. Further, the first lever member 4 is formed with first and second spring receiving portions 4b and 4c serving as a spring receiving portion that receive the torsion coil spring 6, and a cam portion 4d, and the first and second spring receiving portions 4b and 4c are formed so as to be spaced apart from each other on both right and left sides of the first lever member 4 in a direction orthogonal to the longitudinal direction of the tong hole 4a. The cam portion 4d protrudes on the side of a rear end of the first lever member 4, and has a cross-section that is formed in a semicircular shape that forms a curved surface on the side of a distal end of the first lever member 4, i.e., on the side where the first lever member abuts on a canceling projection 23. Meanwhile, the second lever member 5 is formed with an opening 5a and an cutout portion 5b, and a hole 5c is formed between the opening 5a and the cutout portion 5b. The pivot 16 is inserted into the hole 5c, and the second lever member 5 is adapted to be rotatable about the pivot 16. Further, a connecting pin 5d is erected from the distal end of the second lever member 5, and the connecting pin 5d is also inserted into the tong hole 4a of the first lever member 4. Accordingly, the first lever member 4 and the second lever member 5 are supported with respect to the second case 2 so as to be rotatable in conjunction with each other. In addition, although the first and second spring receiving portions 4b and 4c that are formed so as to be spaced apart from each other in the direction orthogonal to the longitudinal direction of the tong hole 4a is described in this embodiment, the spring receiving portions 4b and 4c may be configured so as to be on the same plane.

The torsion coil spring 6 has a winding portion 6a that is inserted onto the boss 16, and a first arm portion 6b that linearly extends in a cantilever shape as the winding portion 6a as a fixed end, and a second arm portion 6c that is latched on an inside watt of the second case 2, and a distal end of the first arm portion 6b on the side of the free end is formed with a bent portion 6d that is bent toward the rotational locus or rotation axis of the canceling projection 23 are formed. As shown in FIG. 4, when the operating lever 3 is in a neutral position, that is, when the tip of the first lever member 4 faces an outer peripheral face of the canceling projection 23 to be described, the portion between the winding portion 6a and the bent portion 6d, and the portion between the bent portion 6d and the distal end on the side of the free end respectively abut on the first and second spring receiving portions 4b and 4c of the first lever member 4 in the first arm portion 6b, and the first lever member 4 receives the resilient force of the torsion coil spring 6, and is biased so as to approach the rotational locus of the canceling projection 23 along the longitudinal direction of the tong hole 4a.

As mentioned above, the operating lever 3 includes the actuating member 7, the holder 8, the movable member 9, and the like, and the actuating member 7 is integrated with a root portion of the operating lever 3. As shown in FIG. 2, the spring 17 and a first driving body 18 are slidably held at a front end of the actuating member 7, and the first driving body 18 receives the resilient force of the spring 17, and is biased in a direction in which it protrudes from the actuating member 7. Further, a projection 7a is formed at a tower end of the actuating member 7, and the projection 7a is engaged with the aforementioned slider receiving body 13. The actuating member 7 and the holder 8 are rotatably connected via a pin 19, and a tip of the first driving body 18 is brought into pressure contact with a cam surface 8a formed inside the holder 8. Both upper and tower faces of the holder 8 are formed with a circular-arc projection 8b and a cylindrical portion 8c, and the circular-arc projection 8b and the cylindrical portion 8c are inserted into a guide groove 1a and boss 2a that are provided in the first and second cases 1 and 2, respectively. Accordingly, in a case where the operating lever 3 is rotationally operated to a right-turn or left-turn indicated position, the operating lever 3 and the holder 8 integrally rotate in the horizontal direction with respect to the housing (both cases 1 and 2) with a straight fine passing through the center of the boss 2a as an axis of rotation. However, in a case where the operating lever 3 is rotationally operated in a direction orthogonal to the horizontal direction, the operating lever 3 rotates by a predetermined angle in the vertical direction with respect to the housing and the holder 8 with the pin 19 as an axis of rotation. Further, the spring 20 and a second driving body 21 are slidably held at a front end of the holder 8, and a tip of the second driving body 21 receives the resilient force of the spring 20, and is brought into pressure contact with the cam surface 10a of the stop plate 10.

The movable member 9 is rotatably supported at the distal end of the holder 8, and an upper face thereof is formed with a pair of spring receiving projections 9a. Also, by latching both the arm portions of the torsion coil spring 22 wound around the movable member 9 on the spring receiving projections 9a and the holder 8, respectively, the movable member 9 is always biased in the direction of a center position. Further, a tower end of the movable member 9 is formed with a circular-arc cam portion 9b having a cross-section that forms a curved surface on the side where the tower end faces the pivot 15 of the second case 2, and the curved surface of the cam portion 9b faces and abuts on the curved surface of the cam portion 4d of the first lever member 4. Here, the cam portion 4d of the first lever member 4 abuts on the cam portion 9b provided in the holder 8 toward the inside of the rotational locus of the canceling projection 23. Moreover, the tower end of the movable member 9 is formed with a driving portion 9c and a projection 9d, the driving portion 9c reaches the cutout portion 5b of the second lever member 5, and the projection 9d is engaged with the aforementioned slider receiving body 12.

Next, the operation of the turn signal switch device configured as described above will be described mainly with reference to FIG. 5.

First, in a case where the operating lever 3 is in the neutral position, the tip of the second driving body 21 abuts on the valley portion of the cam surface 10a of the stop plate 10, and is stably held in the neutral position by the resilient force of the spring 20. At this time, as shown in FIG. 4, the cam portion 4d of the first lever member 4 and the cam portion 9b of the movable member 9 abut on each other at the apexes of the curved surfaces thereof, and the first lever member 4 retreats against the biasing force of the torsion coil spring 6. Accordingly, the tip of the first lever member 4 is located out of the rotational locus of the canceling projection 23 that rotates in conjunction with the steeling wheel, and even if the steeling wheel is rotated in this state, the canceling projection 23 does not abut on the first lever member 4, and the operating lever 3 is maintained in the neutral position.

When the operating lever 3 is rotated in the direction of either right-turn or left-turn indicated position from the neutral position, since the tip of the second driving body 21 is locked to a locking portion (not shown) beyond the slope of the cam surface 10a, the operating lever 3 is stably held in a locked state. For example, when the operating lever 3 is rotated in the direction of a right-turn indicated position (first operating position), the holder 8 and the movable member 9 also rotate in the same direction in conjunction with the operating lever 3, and accordingly, the cam portion 9b and the driving portion 9c are displaced to positions shown in (a-1) of FIG. 5 from FIG. 4. Therefore, the apex of the cam portion 9b deviates from the cam portion 4d. As a result, the first lever member 4 receives the resilient force of the torsion coil spring 6, and advances in the longitudinal direction of the tong hole 4a, and the distal end of the first lever member 4 abuts on an outer peripheral face of the canceling projection 23. At this time, the portion between a fixed end of the winding portion 6a of the torsion coil spring 6 and the bent portion 6d, and the portion between the bent portion 6d and the distal end on the side of the free end respectively abut on the first and second spring receiving portions 4b and 4c on both sides of the first lever member 4. Further, since the projection 9d of the movable member 9 drives one slider receiving body 12 with the rotation of the operating lever 3 in the right-turn direction, switching of a contact point that is not shown is performed by the slider receiving body 12, and a lamp for right turn flickers.

When the steeling wheel is rotationally operated in a right-turn direction from the right-turn rotation state of the operating lever 3, the canceling projection 23 rotates in the direction of the arrow B of (a-1) of FIG. 5 white it comes into sliding contact with the distal end of the first lever member 4, and when the canceling projection 23 has rotated by a predetermined angle θ1 (about 26 degrees) as shown in (a-2) of FIG. 5, the distal end of the first lever member 4 deviates from the outer peripheral face of the canceling projection 23, and advances into the rotational locus. In this case, the canceling projection 23 is displaced to a position shown in (a-2) of FIG. 5 from (a-1) of FIG. 5, and the first lever member 4 deviates from the outer peripheral face of the canceling projection 23 and advances into the rotational locus. In this process, the distal end of the first lever member 4 is dragged by the canceling projection 23, and rotates in a direction in which the distal end approaches the winding portion □□(fixed end) of the torsion coil spring 6. Therefore, as the first spring receiving portion 4b of the first lever member 4 moves toward the fixed end of the first arm portion 6b, the first arm portion 6b is gradually deflected and deformed to accumulate force so that the torsion coil spring 6 may increase its deflection, and the second spring receiving portion 4c separates from bent portion 6d.

Thereafter, when the steeling wheel is rotationally operated in the opposite direction (the direction of the arrow A) as shown in (a-3) of FIG. 5, the canceling projection 23 bumps against the distal end of the first lever member 4 during the returning operation thereof. As a result, the first lever member 4 rotates in the clockwise direction about the guide shaft 14, and the torque thereof is transmitted to the second lever member 5 via the connecting pin 5d from the tong hole 4a, thereby rotating the second lever member 5 in the clockwise direction about the pivot 15. Therefore, the second cutout portion 5b of the second lever member 5 is rotationally displaced upward in this drawing. Since this causes a peripheral edge of the cutout portion 5b to press the driving portion 9c upward, the tip of the second driving body 21 deviates from the locking portion of the cam surface 10a, and shifts to the central valley portion, and the operating member 3, the first lever member 4 that has advanced into the rotational locus retreats from the rotational locus, and the first and second lever members 4 and 5 automatically return to the neutral position shown in FIG. 4.

In contrast, when the operating lever 3 is rotated in the direction of a left-turn indicated position (second operating position), the holder 8 and the movable member 9 also rotate in the same direction in conjunction with the operating lever 3, and accordingly, the cam portion 9b and the driving portion 9c are displaced to positions shown in (b-1) of FIG. 5 from FIG. 4. Therefore, the apex of the cam portion 9b deviates from the cam portion 4d. As a result, the first lever member 4 receives the resilient force of the torsion coil spring 6, and advances in the longitudinal direction of the tong hole 4a, and the distal end of the first lever member 4 abuts on an outer peripheral face of the canceling projection 23. Further, since the projection 9d of the movable member 9 drives the other slider receiving body 12 with the rotation of the operating lever 3 in the left-turn direction, switching of a contact point that is not shown is performed by the slider receiving body 12, and a lamp for left turn flickers.

Also, when the steeling wheel is rotationally operated in a left-turn direction from the left-turn rotation state of the operating lever 3, the canceling projection 23 rotates in the direction of the arrow A of (b-1) of FIG. 5 white it comes into sliding contact with the distal end of the first lever member 4, and when the canceling projection 23 has rotated by a predetermined angle θ2 as shown in (b-2) of FIG. 5, the distal end of the first lever member 4 deviates from the outer peripheral face of the canceling projection 23, and advances into the rotational locus. In that process, as the first lever member 4 is dragged by the canceling projection 23, the distal end of the first lever member 4 rotates in a direction away from the winding portion 6 of the torsion coil spring 6, and accordingly, the second spring receiving portion 4c of the first lever member 4 moves toward the tip of the bent portion 6d. However, the portion between the bent portion 6d and the distal end of the first arm portion 6b on the side of the free end is bent toward the rotational locus of the canceling projection 23 from the first arm portion 6b. Therefore, like at the time of the right turn of the operating lever 3, the first arm portion 6b, the first arm portion 6b is gradually deflected and deformed to accumulate force so that the torsion coil spring 6 may increase its deflection. FIG. 6 shows a state at this time. In this drawing, a normal torsion coil spring serving as a comparative example in which a bent portion is not formed is shown by a two-dot chain fine. As apparent from this drawing, if the portion between the bent portion 6d of the first arm portion 6b and the distal end thereof on the side of the free end is adapted to abut on the first lever member when the distal end of the first lever member 4 rotates in the direction away from the winding portion □□, the first arm portion 6b is largely deformed compared with the normal torsion coil spring with no bent portion, and the resilient force of the torsion coil spring 6, specifically, the resilient force of the first lever member 4 in its advancing direction (direction that turns to the inside of the rotational locus of the canceling projection 23) is accumulated. As a result, since the force that the torsion coil spring 6 pushes out the first lever member 4 in the advancing direction becomes large and consequently, the first lever member 4 easily deviates from the outer peripheral face of the canceling projection 23 at the time of release, the release angles θ1 and θ2 of the first lever member 4 can be set to be approximately equal to each other at the time of the right turn and left turn of the operating lever 3.

Thereafter, when the steeling wheel is rotationally operated in the opposite direction (the direction of the arrow B) as shown in (b-3) of FIG. 5, the canceling projection 23 bumps against the distal end of the first lever member 4 during the returning operation thereof. As a result, the first lever member 4 rotates in the counterclockwise direction about the guide shaft 14, and the torque thereof is transmitted to the second lever member 5 via the connecting pin 5d from the tong hole 4a, thereby rotating the second lever member 5 in the counterclockwise direction about the pivot 15. Therefore, the cutout portion 5b of the second lever member 5 is rotationally displaced downward in this drawing. Since this causes a peripheral edge of the cutout portion 5b to press the driving portion 9c downward, the tip of the second driving body 21 deviates from the locking portion of the cam surface 10a, and shifts to the central valley portion, and the operating member 3, and the first and second lever members 4 and 5 automatically return to the neutral position shown in FIG. 4.

In addition, when the operating lever 3 is rotated in the direction orthogonal to an indicated position, as mentioned above, the actuating member 7 integrated with the operating lever 3 rotates by a predetermined angle in the vertical direction with respect to the housing (both cases 1 and 2) and the holder 8 with the pin 19 as an axis of rotation, and accordingly, the tip of the first driving body 18 slides on the cam surface 8a of the holder 8. Further, since the projection 7a of the actuating member 7 drives the other slider receiving body 13 with such rotation of the operating lever 3, switching of a contact point that is not shown is performed by the slider receiving body 13, and beam switching or passing operation is performed.

As described above, in the turn signal switch device according to this embodiment, the bent portion 6d that is bent in the direction of the rotational locus of the canceling projection 23 is formed on the side of the free end of the first arm portion 6b that protrudes linearly from the winding portion 6a of the torsion coil spring 6, and when the first lever member 4 has rotated in the direction away from the winding portion 6a of the torsion coil spring 6, a resilient force is given to the first lever member 4 from the portion between the bent portion 6d and a distal end on the side of the free end. Thus, the first arm portion 6b is deformed largely, and the resilient force of the torsion coil spring 6 in the advancing direction of the first lever member 4, i.e., in the direction that turns to the inside of the rotational locus of the canceling projection 23, is accumulated. Therefore, the force that the torsion coil spring 6 pushes out the first lever member 4 in the advancing direction becomes large, and the first lever member 4 easily deviates from the outer peripheral face of the canceling projection 23. As a result, when the operating lever 3 is rotationally operated to the right-turn indicated position (first operating position), or left-turn indicated position (second operating position) at the time of release, the release angles of the operating lever 3 can be set to be approximately equal to each other in the rotational direction thereof.

In addition, in the turn signal switch device according to this embodiment, the spring receiving portions 4b and 4c abut on the portion between the winding portion 6a and the bent portion 6d, and the portion between the bent portion 6d and the distal end of the first arm portion 6b (torsion coil spring 6) on the side of the free end, respectively, in the neutral position of the operating lever 3. However, the spring receiving portions 4b and 4c may be configured so as to abut on only the portion between the winding portion 6a and bent portion 6c of the torsion coil spring 6 in the neutral position of an operating lever. In addition, in the turn signal switch device according to this embodiment, the bent portion 6d of the torsion coil spring 6 is bent at an obtuse angle. However, the bent portion may be bent in a curved shape.

The invention claimed is:

1. A turn signal switch device comprising:
a housing having a cam surface;
an operating lever that is rotatably supported by the housing;
a driving body that holds the operating lever in three positions including first and second operating positions and a neutral position in cooperation with the cam surface;
a first lever member that advances into or retreats from a rotational locus of a canceling projection on the side of a steering wheel, and that is rotationally operated when abutting on the canceling projection in a state of having advanced into the rotational locus;
a torsion coil spring that resiliently biases the first lever member so as to approach the rotational locus of the canceling projection; and
a second lever member that returns the operating lever to the neutral position from the first and second operating positions in conjunction with the rotation of the first lever member,
the first lever member being made to retreat out of the rotational locus of the canceling projection against the resilient force of the torsion coil spring by the operating lever when the operating lever is in the neutral position, and
the first lever member being made to advance into the rotational locus of the canceling projection by the resilient force of the torsion coil spring when the operating lever is in the first and second operating positions,
wherein a winding portion of the torsion coil spring is supported in a lateral position of the first lever member by the housing, a bent portion that is bent toward the rotational locus of the canceling projection is formed on the side of a free end of one arm portion that protrudes linearly from the winding portion as a fixed end, the other arm portion is latched on the housing, and when a distal end of the first lever member rotates in a direction away from the winding portion, a resilient force is given to the first lever member from a portion between the bent portion and the distal end on the side of the free end.

2. The turn signal switch device according to claim 1, wherein the first lever member comprises a spring receiving portion that abuts on the torsion coil spring, and the spring receiving portion abuts on a portion between the bent portion and the distal end on the side of the free end in the neutral position of the operating lever.

3. The turn signal switch device according to claim 1, wherein a holder that supports the operating lever so as to be rotatable with respect to the housing is provided between the operating lever and the cam surface, the driving body is provided in the holder so as to be resiliently biased against the cam surface, the second lever member is rotatably supported by the housing, the first lever member and the second lever member are rotatably connected, the holder and the second lever member are engaged with each other so that the holder and the second lever member may interlock with each other when the holder rotates more than a predetermined range of angle, cam portions are provided in the first lever member and the holder, respectively, and the cam portion of the first lever member is made to abut on the cam portion of the holder toward the inside of the rotational locus of the canceling projection.

4. The turn signal switch device according to claim 2, wherein a holder that supports the operating lever so as to be rotatable with respect to the housing is provided between the operating lever and the cam surface, the driving body is provided in the holder so as to be resiliently biased against the cam surface, the second lever member is rotatably supported by the housing, the first lever member and the second lever member are rotatably connected, the holder and the second lever member are engaged with each other so that the holder and the second lever member may interlock with each other when the holder rotates more than a predetermined range of angle, cam portions are provided in the first lever member and the holder, respectively, and the cam portion of the first lever member is made to abut on the cam portion of the holder toward the inside of the rotational locus of the canceling projection.

* * * * *